(12) United States Patent
Ishikawa

(10) Patent No.: US 11,588,949 B1
(45) Date of Patent: Feb. 21, 2023

(54) IMAGE FORMING APPARATUS AND CONVEYANCE CONTROL METHOD

(71) Applicant: TOSHIBA TEC KABUSHIKI KAISHA, Tokyo (JP)

(72) Inventor: Ryuta Ishikawa, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/403,362

(22) Filed: Aug. 16, 2021

(51) Int. Cl.
*H04N 1/00* (2006.01)

(52) U.S. Cl.
CPC ....... *H04N 1/0066* (2013.01); *H04N 1/00602* (2013.01); *H04N 1/00702* (2013.01); *H04N 1/00716* (2013.01); *H04N 1/00724* (2013.01); *H04N 1/00745* (2013.01); *H04N 1/00779* (2013.01); *H04N 2201/0094* (2013.01)

(58) Field of Classification Search
CPC .......... B65H 2511/152; B65H 2511/22; B65H 2511/514; B65H 2513/10; B65H 2513/50; B65H 2513/511; B65H 2513/512; B65H 2513/53; B65H 2557/2423; B65H 2701/1311; B65H 2701/1313; B65H 2801/06; B65H 43/06; B65H 7/18; G03G 15/50; G03G 15/6529; G03G 15/6564; G03G 2215/00721; H04N 1/00002; H04N 1/00005; H04N 1/00015; H04N 1/00029; H04N 1/00074; H04N 1/00082; H04N 1/00408; H04N 1/00411; H04N 1/00456; H04N 1/00474; H04N 1/00482; H04N 1/00602; H04N 1/00931; H04N 2201/0098; H04N 1/0032; H04N 1/0057; H04N 1/00578; H04N 1/00588; H04N 1/00591; H04N 1/00612; H04N 1/00652; H04N 1/00925
USPC ......................................................... 358/498
See application file for complete search history.

(56) References Cited

U.S. PATENT DOCUMENTS

| | | | | |
|---|---|---|---|---|
| 4,888,690 A | * | 12/1989 | Huber | G06F 16/284 |
| 5,689,792 A | * | 11/1997 | Acquaviva | H04N 1/2036 |
| | | | | 399/365 |
| 5,893,657 A | * | 4/1999 | Matsuzawa | G03G 15/70 |
| | | | | 399/388 |

(Continued)

FOREIGN PATENT DOCUMENTS

| | | |
|---|---|---|
| JP | 2004043048 A | 2/2004 |
| JP | 2006182460 A | 7/2006 |
| JP | 2009107782 A | 5/2009 |

*Primary Examiner* — Negussie Worku
(74) *Attorney, Agent, or Firm* — Kim & Stewart LLP

(57) ABSTRACT

According to one embodiment, an image forming apparatus includes a conveying roller to convey sheets of different types along a conveyance path, a first sensor to detect a sheet being conveyed at a first position, a second sensor to detect the sheet being conveyed at a second position that is at a fixed distance downstream of the first position, a registration roller pair that is downstream of the second sensor, and a control unit. The control unit calculates a transit time for the sheet between the first position and the second position according detection results from the first and second sensors, and then sets a conveying distance for the sheet after the second position to be used for aligning the sheet against the registration roller pair based on the calculated transit time of the sheet.

19 Claims, 5 Drawing Sheets

(56) References Cited

U.S. PATENT DOCUMENTS

| | | | |
|---|---|---|---|
| 9,776,819 B2* | 10/2017 | Yamane | B65H 9/20 |
| 10,621,208 B2* | 4/2020 | Chung | G06Q 30/0625 |
| 2005/0067491 A1* | 3/2005 | Ishikawa | G06Q 10/10 |
| | | | 235/383 |
| 2013/0026696 A1* | 1/2013 | Matsumoto | B65H 3/128 |
| | | | 271/11 |
| 2014/0210152 A1* | 7/2014 | Kakuta | B65H 3/46 |
| | | | 271/3.16 |
| 2016/0246237 A1* | 8/2016 | Maruyama | B65H 9/002 |
| 2018/0050880 A1* | 2/2018 | Kuwata | B65H 3/0669 |
| 2020/0192249 A1* | 6/2020 | Geshi | G03G 15/6564 |

* cited by examiner

IMAGE FORMING APPARATUS AND CONVEYANCE CONTROL METHOD

FIELD

Embodiments described herein relate generally to an image forming apparatus and a sheet conveyance control method for an image forming apparatus or the like.

BACKGROUND

In an image forming apparatus, when a sheet is conveyed, the sheet generally needs to be aligned using a preset value corresponding to a sheet type and the known characteristics of the sheet conveying mechanism. However, if surface properties of a roller or the like in the sheet conveying mechanism changes due to wear of the roller, slippage may occur on the roller surface when the preset value is used. As a result, the accuracy of sheet alignment may deteriorate.

DETAILED DESCRIPTION

In general, according to one embodiment, an image forming apparatus includes a conveying roller configured to convey sheets of different types along a conveyance path; a first sensor configured to detect a sheet being conveyed along the conveyance path at a first position; a second sensor configured to detect the sheet being conveyed along the conveyance path at a second position that is at a first distance downstream of the first position along the conveyance path; a registration roller pair that is downstream of the second sensor along the conveyance path; and a control unit. The control unit is configured to calculate a transit time for the sheet along the conveyance path between the first position and the second position according detection results from the first and second sensors, and then set a conveying distance for the sheet after the second position to be used for aligning the sheet against the registration roller pair based on the calculated transit time of the sheet.

Hereinafter, an image forming apparatus and a conveyance control method according to certain example embodiments will be described with reference to the drawings.

First Embodiment

Figure 1:
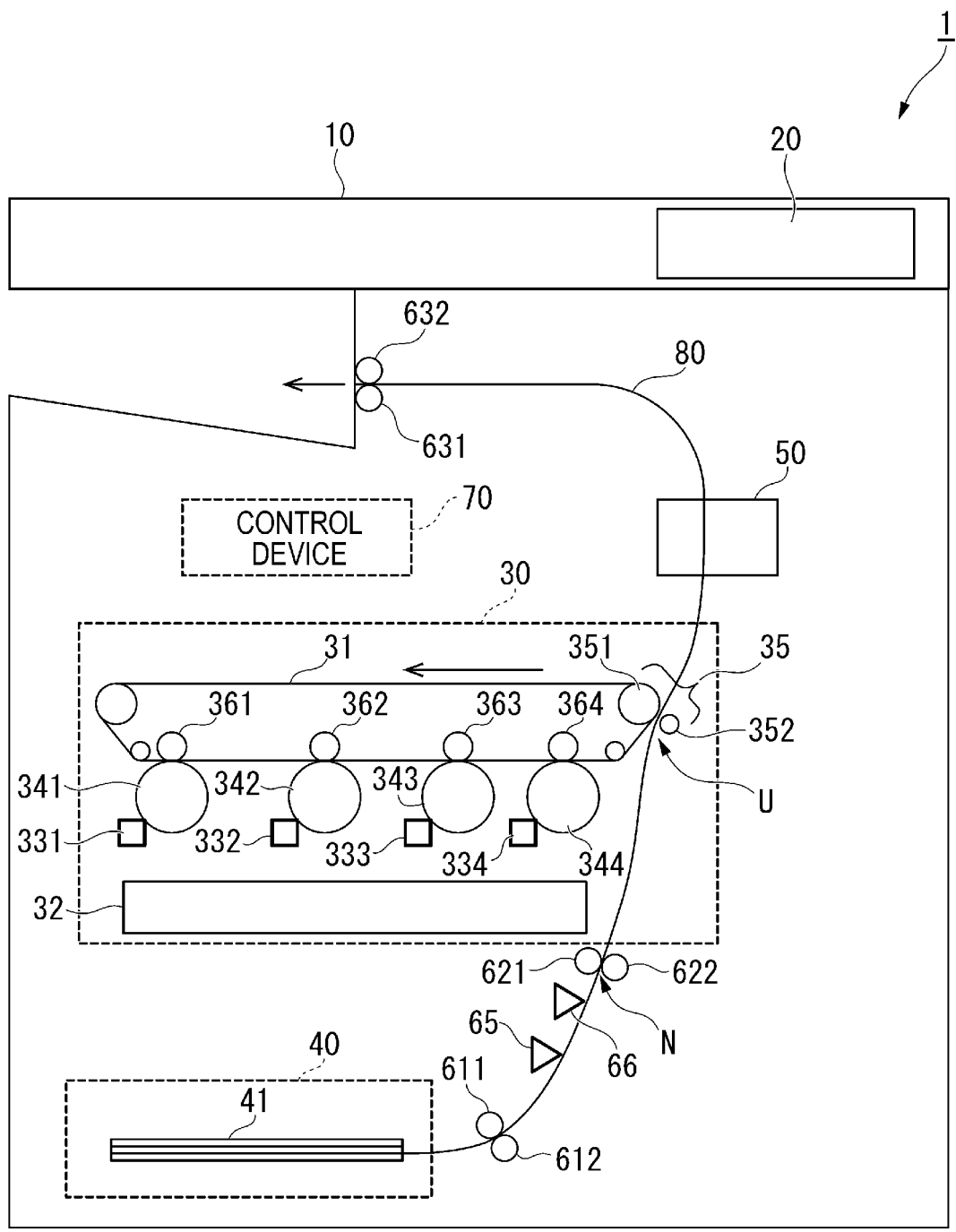
FIG. 1 is a diagram illustrating an overall configuration of an image forming apparatus according to a first embodiment.

FIG. 1 is a diagram illustrating an overall configuration of an image forming apparatus 1 according to a first embodiment. The image forming apparatus 1 is, for example, a multi-function peripheral (MFP). The image forming apparatus 1 executes printing through an image forming process followed by an image fixing process. The image forming process is a process of forming an image on a sheet with a recording agent such as toner. The image fixing process is a process of fixing the image previously formed on the sheet to the sheet with heat and/or pressure. The sheet is, for example, paper on which text, images, or the like can be formed. In general, the sheet may be any material as long as the image forming apparatus 1 can form an image on the sheet.

The image forming apparatus 1 includes an image reading unit 10, a control panel 20, an image forming unit 30, a sheet accommodation unit 40, a fixing unit 50, conveying rollers 611 and 612, registration rollers 621 and 622, paper discharge rollers 631 and 632, a first sensor 65, a second sensor 66, and a control device 70.

The first sensor 65 and the second sensor 66 are provided at position along a portion of the sheet conveyance path between the conveying rollers 611 and 612 on one end and the registration rollers 621 and 622 on the other end. The first sensor 65 and the second sensor 66 are used for aligning the sheet. The alignment of the sheet is a process of allowing the leading edge of the sheet to abut against the registration rollers 621 and 622 to correct or control an angle or skew of the sheet being conveyed.

The image reading unit 10 provides an image of a document based a scanning processing returning differences in brightness and darkness of light from the document being scanned. For example, the image reading unit 10 reads an image on a document placed on a document reading platen (glass platen) or the like. The image reading unit 10 records the image information acquired by scanning the document. The recorded image information may be transmitted to another information processing apparatus via a network. The image forming unit 30 may form an image on another sheet based on the recorded image information.

The control panel 20 includes a display unit and an input operation unit. The display unit is a display device such as a liquid crystal display or an organic electro luminescence (EL) display. The display unit displays various information relating to the image forming apparatus 1 in accordance with the control of the control device 70. The input operation unit includes a plurality of buttons or the like that can be manipulated, selected, or otherwise operated by a user. The input operation unit receives input operations from a user. For example, the input operation unit receives a user selections of a sheet type and other printing parameters. The input operation unit outputs a signal corresponding to the input operation(s) performed by the user to the control device 70. The display unit and the input operation unit may be configured as an integrated touch panel (e.g., a touch panel display or touch screen).

The image forming unit 30 executes the image forming process. Specifically, the image forming unit 30 forms an image on a sheet based on image information generated by the image reading unit 10 or image information received by the image forming apparatus 1 from an external device through a communication path such as a network connection or a USB-type connector. The image forming unit 30 in this example forms a toner image on the sheet in the image forming process.

The image forming unit 30 includes a transfer belt 31, an exposure unit 32, a plurality of developing units 331 to 334, a plurality of photoconductive drums 341 to 344, a transfer unit 35, and a plurality of primary transfer rollers 361 to 364.

The transfer belt 31 is an intermediate transfer medium and forms a continuous loop. The transfer belt 31 rotates in a direction (counterclockwise) indicated by an arrow in FIG. 1 by rotation of a roller or rollers.

The exposure unit 32 is provided at a position facing each of the photoconductive drums 341, 342, 343, 344. The developing units 331, 332, 333, 334 and corresponding charging units are respectively associated with the photoconductive drums 341 to 344. The exposure unit 32 irradiates the surface (a photoreceptor layer) of the photoconductive drums 341 to 344 with laser light based on the image information being printed. The direction in which laser light is deflected for the scanning along each line of the image onto the photoconductive drum is a main scanning direction, and a direction perpendicular to the main scanning direction is a sub-scanning direction. For example, in the embodiment, the main scanning direction parallels an axial direction of the photoconductive drums, and the sub-scanning direction corresponds to the rotational (circumferential) direction of the photoconductive drums. That is, the sub-scanning direction is the direction between adjacent main scanning lines of the image being formed.

Due to irradiation of laser light, charge on the surface (photoreceptor layer) of each of the photoconductive drums 341 to 344 is eliminated (discharged). As a result, an electrostatic pattern is formed with laser light on the surface of each of the photoconductive drums 341 to 344. That is, due to the irradiation of laser light by the exposure unit 32, an electrostatic latent image is formed on the surface of each of the photoconductive drums 341 to 344 corresponding to the image information being printed. The exposure unit 32 may use Light Emitting Diode (LED) light instead of laser light in other examples. The exposure unit 32 is controlled by the control device 70 to emit light based on the image information.

The developing units 331 to 334 supply toner to the surfaces of the photoconductive drums 341 to 344. For example, the developing unit 331 develops the electrostatic latent image on the surface of the photoconductive drum 341 with yellow (Y) toner. The developing unit 332 develops the electrostatic latent image on the surface of the photoconductive drum 342 with magenta (M) toner. The developing unit 333 develops the electrostatic latent image on the surface of the photoconductive drum 343 with cyan (C) toner. The developing unit 334 develops the electrostatic latent image on the surface of the photoconductive drum 344 with black (K) toner.

The developing units 331 to 334 thus form toner images on the photoconductive drums 341 to 344 corresponding to the previously formed electrostatic latent images. The toner images formed on the photoconductive drums 341 to 344 are transferred (primarily transferred) to the transfer belt 31 by the primary transfer rollers 361 to 364. The primary transfer roller 361 is provided at a position facing the photoconductive drum 341 with the transfer belt 31 interposed therebetween. The primary transfer roller 362 is provided at a position facing the photoconductive drum 342 with the transfer belt 31 interposed therebetween. The primary transfer roller 363 is provided at a position facing the photoconductive drum 343 with the transfer belt 31 interposed therebetween. The primary transfer roller 364 is provided at a position facing the photoconductive drum 344 with the transfer belt 31 interposed therebetween.

The transfer unit 35 includes a support roller 351 and a secondary transfer roller 352. The transfer unit 35 transfers the toner image(s) on the transfer belt 31 to a sheet at a secondary transfer position U. The secondary transfer position U is a position where the support roller 351 and the secondary transfer roller 352 face each other with the transfer belt 31 interposed therebetween. The transfer unit 35 applies a transfer bias to the transfer belt 31 that is controlled by a transfer current. The transfer unit 35 transfers the toner image on the transfer belt 31 to the sheet using the transfer bias. The transfer current is controlled by the control device 70.

The sheet accommodation unit 40 includes one paper feed cassette or a plurality of paper feed cassettes. The respective paper feed cassettes accommodate predetermined types of sheets 41. The predetermined types of sheets 41 have predetermined sizes. The predetermined types of sheets 41 can be sheets of different thicknesses. In the present example, the predetermined types of sheets 41 include a plain paper type (plain paper) and a thick paper type (thick paper). The sheet accommodation unit 40 may additionally accommodate other sheet types besides plain paper and thick paper. The paper feed cassette includes a paper feed roller. The paper feed roller picks up the sheets 41 from the paper feed cassette one by one. The paper feed roller supplies the picked sheet 41 to a conveying unit 80.

The fixing unit 50 executes an image fixing process. Specifically, the fixing unit 50 in this example applies heat and pressure to the sheet 41 to fix the toner image that has been formed on the sheet 41.

The conveying rollers 611 and 612 (a first pair of rollers) supply the sheet 41 fed from the paper feed cassette to the downstream side. For example, the conveying rollers 611 and 612 convey the sheet 41 to the registration rollers 621 and 622 (a second pair of rollers). The downstream side is in a direction further along the direction in which the sheet 41 is being conveyed. For example, the downstream direction is a direction going toward the paper discharge rollers 631 and 632 from the conveying rollers 611 and 612. The conveying rollers 611 and 612 are provided at positions facing each other. The conveying rollers 611 and 612 are controlled by the control device 70 to rotate.

The registration rollers 621 and 622 convey the sheet 41 to the downstream side at a timing to match the timing at which the transfer unit 35 can appropriately transfer the toner image to the surface of the sheet 41. The registration rollers 621 and 622 convey the sheet 41 to the downstream side after the leading edge of the sheet 41 being conveyed is aligned at a nip N. The registration rollers 621 and 622 allow the leading edge of the conveyed sheet 41 to abut thereagainst at the nip N and this abutting is used for correcting any misalignment (skew) of the sheet as fed from the conveying rollers 611 and 612. The registration rollers 621 and 622 are provided on the downstream side of the first sensor 65 and the second sensor 66. The registration rollers 621 and 622 are controlled by the control device 70 to rotate.

The paper discharge rollers 631 and 632 discharge the sheet 41 that has been passed through the fixing unit 50 to a discharge unit. The paper discharge rollers 631 and 632 are provided at positions facing each other. The paper discharge rollers 631 and 632 are controlled by the control device 70 to rotate.

The first sensor 65 and the second sensor 66 are disposed at a fixed distant from each other along the conveying direction of the sheet 41. The first sensor 65 and the second sensor 66 detect the sheet 41 that has been conveyed by the conveying rollers 611 and 612. For example, the first sensor 65 and the second sensor 66 both detect the leading edge of the sheet 41. The first sensor 65 and the second sensor 66 output the detection result to the control device 70.

The control device 70 controls each of the various subcomponents of the image forming apparatus 1.

The conveying unit 80 is collectively the system of rollers, guides, conveyance mechanisms that is used convey the sheet 41 through the image forming apparatus 1. The conveying unit 80 may also be referred to as a conveyance path or conveyance pathway of the sheet 41.

Figure 2:
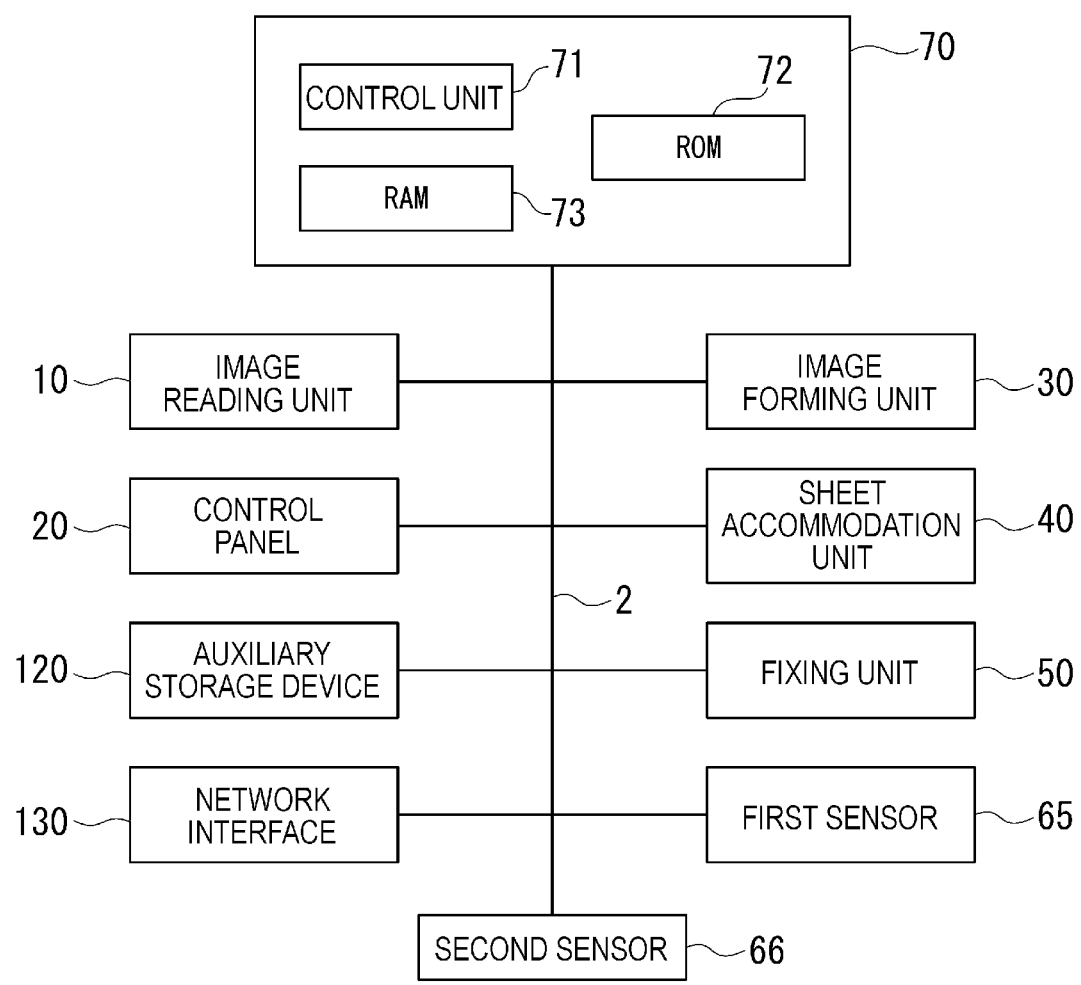
FIG. 2 is a block diagram illustrating a hardware configuration of an image forming apparatus according to a first embodiment

FIG. 2 is a block diagram illustrating a hardware configuration of the image forming apparatus 1 according to the first embodiment. As depicted in FIG. 2, the image forming apparatus 1 includes an image reading unit 10, a control panel 20, an image forming unit 30, a sheet accommodation unit 40, a fixing unit 50, a first sensor 65, a second sensor 66, a control device 70, an auxiliary storage device 120, and a network interface 130. These components are connected to each other through a system bus 2 for data communication.

The control device 70 includes a control unit 71, a read only memory (ROM) 72, and a random access memory (RAM) 73. The control unit 71 can be a processor such as a central processing unit (CPU) or a graphics processing unit (GPU). The control unit 71 controls operations of the respective components of the image forming apparatus 1. The control unit 71 performs various processes and functions by loading a program from the ROM 72 to the RAM 73 and then executing the loaded program. In some examples, an application specific integrated circuit (ASIC) may be used as the control unit 71 or for providing certain functions of the control device 70. The ASIC is a dedicated circuit for implementing a specific function.

A specific operation of the control unit 71 in the first embodiment will be described as an example.

In order to align the sheet 41, the control unit 71 pauses the conveyance of the sheet 41 after the sheet 41 passes the first sensor 65 and the second sensor 66. The control unit 71 then conveys the sheet onward after a waiting period (for example, several milliseconds) starting from the pause. The sheet 41 is aligned by causing the leading edge of the sheet 41 to abut against the registration rollers 621 and 622.

The control unit 71 determines the conveying distance of the sheet 41 (the distance sheet 41 has been conveyed) during the alignment based on a transit time of the sheet 41 between the first sensor 65 and the second sensor 66. Here, the control unit 71 acquires the transit time of the sheet 41 based on the times at which the leading edge of the sheet 41 is detected by the first sensor 65 and the second sensor 66.

The control unit 71 controls the conveying speed of the sheet 41 during the alignment in accordance with the thickness of the sheet 41. The thickness varies depending on the type of the sheet 41 being used. If the type of the sheet 41 is known (e.g., has been set by the user via control panel 20), the control unit 71 can acquire the sheet thickness corresponding to the type of the sheet 41.

The ROM 72 stores a program for configuring the control unit to perform required operations/processes. The RAM 73 temporarily stores data used by each of the various units included in the image forming apparatus 1. For example, the RAM 73 stores information indicating the respective times at which the sheet 41 was detected by the first sensor 65 and the second sensor 66. The RAM 73 may also store digital data generated by the image reading unit 10. The RAM 73 may temporarily store a print job and a job log.

The auxiliary storage device 120 is, for example, a hard disk or a solid-state drive (SSD) and stores various data. The various data in this context includes, for example, digital image data, a print job, a job log, and a control table.

In this context, a control table is a table where control information regarding the alignment is registered. For example, in the control table, information regarding the type of the sheet 41, the transit time, the conveying distance, and the conveying speed are associated with each other. That is, values for the expected or nominal transit time, the conveying distance, and conveying speeds are stored in association with a sheet type to which a sheet 41 processed by the image forming apparatus 1 may belong. The transit time refers to the period of time it takes for the sheet 41 to passe between the first sensor 65 and the second sensor 66. For example, the transit time is the period of time from when the sheet 41 (leading edge) is detected by the first sensor 65 to when the sheet 41 (leading edge) is detected by the second sensor 66.

The conveying distance in this context is the distance the sheet 41 is conveyed for the purpose of executing the sheet alignment. During the alignment, it is necessary to cause the leading edge of the sheet 41 to abut against the registration rollers 621 and 622 and allow the sheet to bend (or bow). Therefore, as the conveying distance, a value corresponding to the distance in which the sheet 41 need to be moved to cause the sheet to sufficiently abut against the registration rollers 621 and 622 is registered. For example, the conveying distance is the sum of a first conveying distance that is from a position where the conveyance is paused to a position where the sheet 41 nominally abuts against the registration rollers 621 and 622 and a second conveying distance in which the sheet 41 is additionally moved beyond the position where the sheet 41 nominally abuts against the registration rollers 621 and 622 in order to bend the sheet 41 and provide the appropriate sheet alignment result.

The conveying speed refers to the speed at which the sheet 41 is conveyed for performing the alignment. That is, the conveying speed is the speed at which the sheet 41 is conveyed from the position after passing the second sensor 66 where the sheet 41 is paused to the position of the registration rollers 621 and 622.

As described above, in the control table, the conveying distance and the conveying speed are registered in association with the type and the transit time of the sheet 41. The thickness of the sheet 41 varies depending on the type of sheet 41. Therefore, in practice, it can be considered that, in the control table, the conveying distance and the conveying speed are registered in association with the thickness and the transit time of the sheet 41. For example, the control device 70 acquires information regarding the conveying distance and the conveying speed from the control table based on the sheet type and the transit time of the sheet 41. The control device 70 aligns the sheet 41 by conveying the sheet 41 based on the acquired information regarding the conveying distance and the conveying speed.

The network interface 130 transmits and receives data to and from another apparatus (an external apparatus). Here, the other apparatus is, for example, an information processing apparatus such as a personal computer. The network interface 130 operates as an input interface and receives data or an instruction from the other apparatus. Examples of the instruction transmitted from the other apparatus include a print execution (print start) instruction. In addition, the network interface 130 operates as an output interface and transmits data to the other apparatus.

Figure 3:
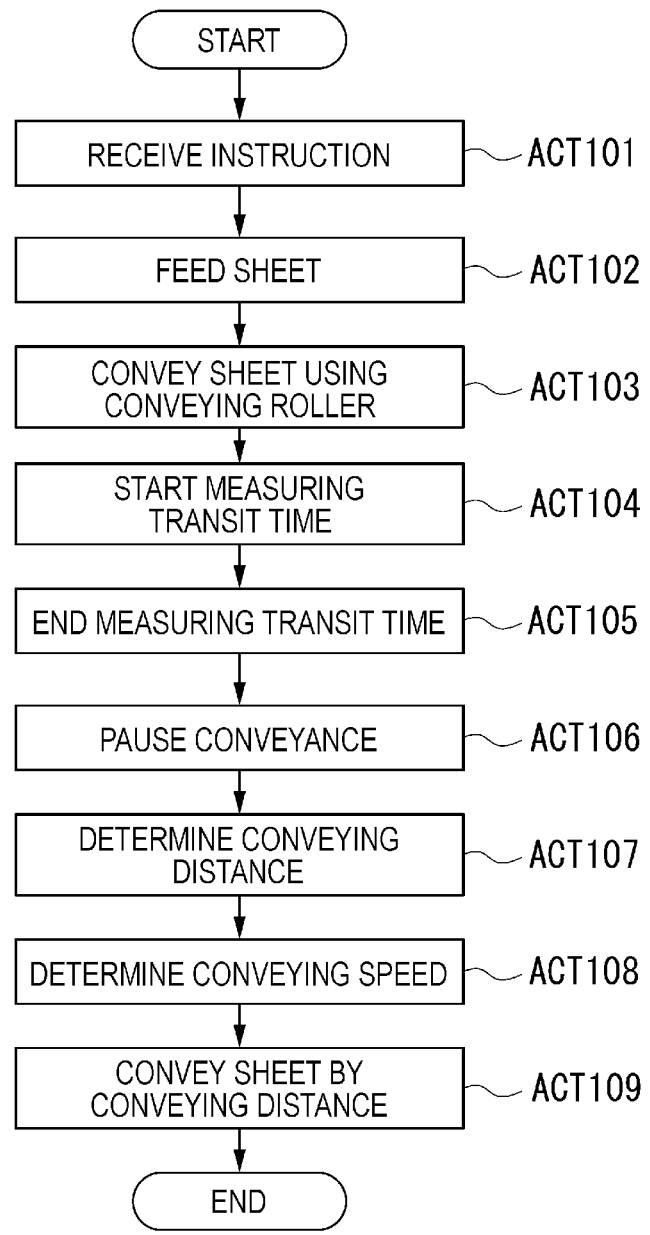
FIG. 3 is a flowchart of an aligning process that can be executed by an image forming apparatus according to a first embodiment.

FIG. 3 is a flowchart illustrating an aligning process that is executed by the image forming apparatus 1 according to the first embodiment.

The control panel 20 receives a print instruction from the user (ACT 101). At this time, the user operates the control panel 20 to input the information regarding the type of the sheet 41. The control panel 20 outputs the print instruction to the control device 70.

The control unit 71 causes the sheet 41 to be fed from the sheet accommodation unit 40 in accordance with the received print instruction (ACT 102). Specifically, the control unit 71 controls the paper feed roller such that a sheet 41 is fed from a paper feed cassette storing the type of sheet 41 the user selected for the printing. The sheet 41 fed from the paper feed cassette is conveyed to the conveying rollers 611 and 612 through a portion of the conveying unit 80.

The conveying rollers 611 and 612 convey the sheet 41 in accordance with an instruction of the control device 70 (ACT 103). The sheet 41 conveyed by the conveying rollers 611 and 612 passes the first sensor 65. The first sensor 65 detects that the sheet 41 (leading edge) has passed and outputs this detection result to the control device 70. The detection result output from the first sensor 65 includes at least information indicating the detection time of the sheet 41.

Once the detection result is acquired from the first sensor 65, the control unit 71 begins measuring the transit time (ACT 104). The control unit 71 stores the detection time acquired by the first sensor 65 as a detection time t1. The sheet 41 conveyed by the conveying rollers 611 and 612 eventually passes the second sensor 66 after passing the first sensor 65. The second sensor 66 detects the sheet 41 (leading edge) has passed the second sensor 66, and outputs this detection result to the control device 70. The detection result output from the second sensor 66 includes at least information indicating the detection time.

Once the detection result is acquired from the second sensor 66, the control unit 71 ends the measuring of the transit time (ACT 105). The control unit 71 stores the detection time acquired by the second sensor 66 as a detection time t2. After the detection result is acquired from the second sensor 66, the control unit 71 pauses the conveyance of the sheet 41 by stopping the rotation of the conveying rollers 611 and 612 (ACT 106). As a result, the sheet 41 is stopped at a position that is on the downstream side from the position of the second sensor 66 but before the registration rollers 621 and 622.

The control unit 71 calculates the transit time of the sheet 41 between the using the detection time t1 and the detection time t2 by subtracting the detection time t1 from the detection time t2, or the like. The control unit 71 then sets (selects) the conveying distance and the conveying speed to be used for the alignment process based on the type of the sheet 41 (as input in the process of ACT 101) and the calculated transit time (ACT 107 and ACT 108). For, example the control unit 71 determines the appropriate conveying distance and conveying speed to be used for the alignment process by reference (lookup) to the control table to obtain the values corresponding to the combination of the sheet type and the calculated transit time for the sheet 41.

The control unit 71 subsequently conveys the previously paused sheet 41 at the now-set (selected) conveying speed for the now-set (selected) conveying distance (ACT 109). As a result, the sheet 41 is bent by an amount corresponding to the second conveying distance after the leading edge of the sheet 41 abuts against the registration rollers 621 and 622. As a result, the direction of the sheet 41 is aligned (that is, sheet in-plane skew is removed).

With the image forming apparatus 1 configured as described above, the accuracy of the sheet alignment can be improved. Specifically, the image forming apparatus 1 selects the conveying distance and the conveying speed for the alignment based on the type of the sheet 41 and the transit time (as calculated using detection results from the first sensor 65 and the second sensor 66). Since the surface properties of a roller can change over time or with use, due to wear, the sheet 41 may slide faster than when the roller was newer and thus the transit time of a sheet may be shorter than was previously the case.

In the related art, alignment is always executed using a preset value, thus the alignment will be executed with the same (preset) value even if the sheet 41 now actually slides faster due to roller wear or the like. On the other hand, in the image forming apparatus 1 according to the first embodiment, the conveying distance and the conveying speed used for the alignment can be changed based on the actual (current) conveyance state of the sheet 41 and the current roller characteristics. Therefore, the accuracy of the sheet alignment can be improved.

Second Embodiment

The first embodiment describes a configuration where the type of the sheet is input by the user. However, if the input operation of the user is erroneous, the conveying distance and the conveying speed during the alignment may be inappropriate values since the incorrect sheet type may be used. Therefore, in the second embodiment, a sensor for detecting the thickness of the sheet is provided so that alignment accuracy does not necessarily have to depend on the correctness of the user's indication of sheet type.

Figure 4:
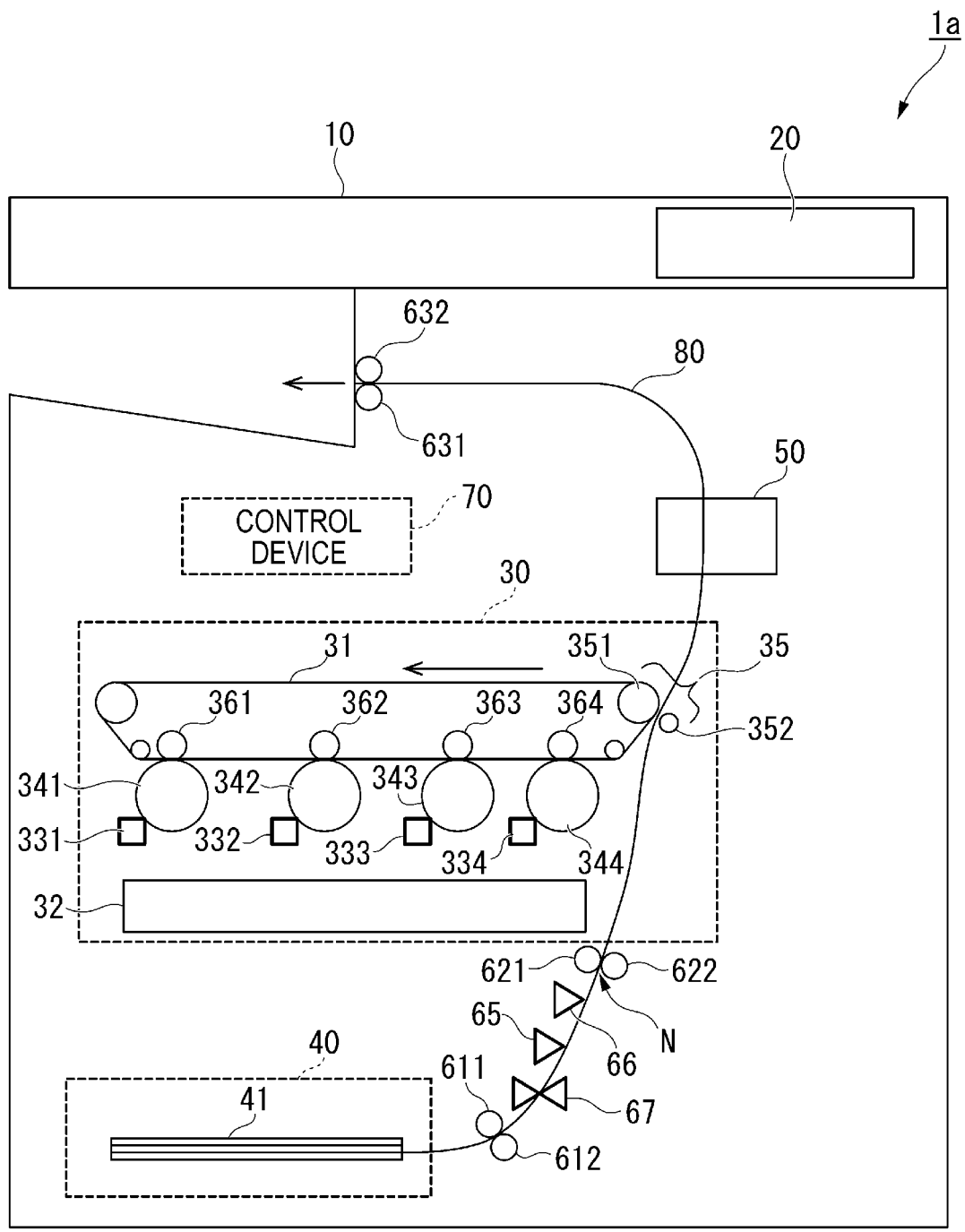
FIG. 4 is a diagram illustrating an overall configuration of an image forming apparatus according to a second embodiment.

FIG. 4 is a diagram illustrating an overall configuration example of an image forming apparatus 1*a* according to a second embodiment. The image forming apparatus 1*a* includes an image reading unit 10, a control panel 20, an image forming unit 30, a sheet accommodation unit 40, a fixing unit 50, conveying rollers 611 and 612, registration rollers 621 and 622, paper discharge rollers 631 and 632, a first sensor 65, a second sensor 66, a thickness detection sensor 67, and a control device 70.

The configuration of the image forming apparatus 1*a* is different from the configuration of the image forming apparatus 1, in that the thickness detection sensor 67 is added. The control device 70 thus uses the sheet thickness detection result from the thickness detection sensor 67 rather than the user designation of sheet type. Additionally, information about the type of the sheet 41 in the control table is substituted with information indicating the thickness of the sheet 41. The other configurations of the image forming apparatus 1*a* are substantially the same as those of the image forming apparatus 1. Hereinafter, different points from the image forming apparatus 1 will be primarily described.

The thickness detection sensor 67 detects the thickness of the sheet 41 that is conveyed by the conveying rollers 611 and 612. The thickness detection sensor 67 outputs a sheet thickness detection result to the control device 70. The thickness detection sensor 67 is provided between the position of the conveying rollers 611 and 612 and the position of the registration rollers 621 and 622. FIG. 4 illustrates the thickness detection sensor 67 being provided between the conveying rollers 611 and 612 and the first sensor 65, in other examples, the thickness detection sensor may be elsewhere along the sheet conveyance path.

In addition to the processing described for the first embodiment, the control unit 71 according to the second embodiment controls the conveying speed of the sheet 41 during the alignment in accordance with the thickness of the sheet 41 as detected by the thickness detection sensor 67.

Figure 5:
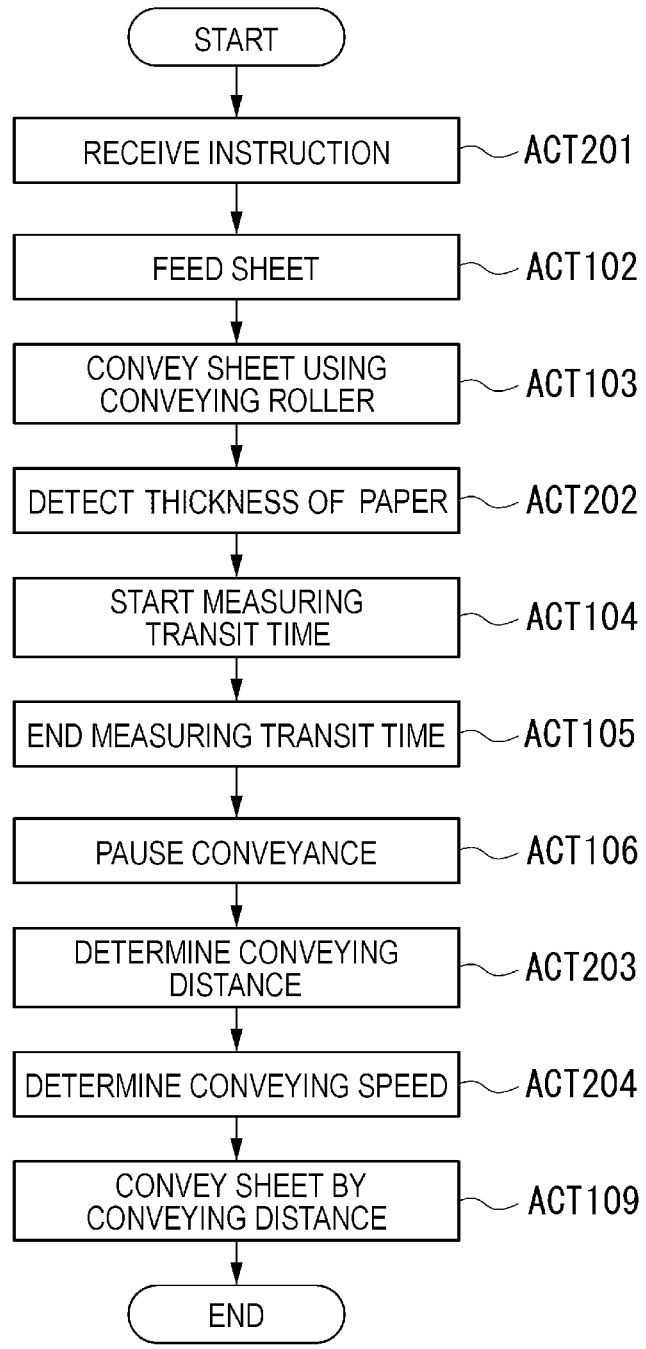
FIG. 5 is a flowchart of an aligning process that can be executed by an image forming apparatus according to a second embodiment.

FIG. 5 is a flowchart illustrating an aligning process that is executed by the image forming apparatus 1*a* according to the second embodiment. In FIG. 5, those processes that are substantially the same as those already described in conjunction with FIG. 3 will be represented by same reference numerals, and the description thereof will not be repeated.

The control panel 20 receives a print instruction from the user (ACT 201). In the second embodiment, the control panel 20 may or may not receive the information indicating the type of the sheet 41 from the user. The control panel 20 outputs the print instruction to the control device 70.

By the processes of ACT 102 and ACT 103, the sheet 41 conveyed by the conveying rollers 611 and 612 passes the thickness detection sensor 67. The thickness detection sensor 67 detects the presence of the sheet 41 and outputs a sheet thickness detection result to the control device 70 including the detection time and information indicating the detected thickness of the sheet 41.

The sheet 41 subsequently passes the first sensor 65 and the second sensor 66 in turn after passing the thickness detection sensor 67. The first sensor 65 and the second sensor 66 detect the sheet 41 (leading edge) when passing the first sensor 65 and the second sensor 66, and each outputs a detection result to the control device 70. Once the processes of ACT 104, ACT 105, and ACT 106 are executed by the control unit 71, the control unit 71 calculates the transit time for the sheet 41 using the detection time t1 and the detection time t2.

The control unit 71 then sets (selects) the conveying distance and the conveying speed to be used for the alignment process based on the thickness of the sheet 41 obtained from the thickness detection sensor 67 and the calculated transit time (ACT 203 and ACT 204). In this example, even if the control unit 71 receives information indicating the type of the sheet 41 from user input through the control panel 20, the control unit 71 preferentially uses the thickness of the sheet 41 measured/detected by the thickness detection sensor 67. The control unit 71 subsequently conveys the previously paused sheet 41 at the now-set (selected) conveying speed for the now-set (selected) conveying distance.

With the image forming apparatus 1a configured as described above, substantially the same effects as those of the first embodiment can be obtained.

In the image forming apparatus 1a, the thickness of the sheet 41 is detected by the thickness detection sensor 67. The image forming apparatus 1a determines the conveying distance and the conveying speed to be used during the alignment using the thickness of the sheet 41 as detected by the thickness detection sensor 67. As a result, even if the user erroneously selects the type of the sheet 41, a conveying distance and a conveying speed that are considered to be appropriate for the alignment can be used. Therefore, the accuracy of the sheet alignment can be improved.

A modification example of the second embodiment will be described.

FIG. 4 illustrates the configuration where the thickness detection sensor 67 is provided between the conveying rollers 611 and 612 and the first sensor 65, but the position where the thickness detection sensor 67 is provided is not limited thereto. For example, the thickness detection sensor 67 may be provided between the first sensor 65 and the second sensor 66, or may be provided between the second sensor 66 and the registration rollers 621 and 622. If the thickness detection sensor 67 is provided between the second sensor 66 and the registration rollers 621 and 622, it is necessary to provide the thickness detection sensor 67 at a position where the thickness of the sheet 41 can be detected when the sheet 41 is paused.

Modification examples common to the first embodiment and the second embodiment will be described.

In one modification, the control unit 71 may determine whether the thickness of the sheet 41 that is being conveyed is greater than a first threshold thickness, the control unit 71 selects a preset conveying distance and a preset conveying speed as the conveying distance and the conveying speed of the sheet 41 to be used during alignment.

For example, the sheet having the first threshold thickness or less may be plain paper, and the sheet having greater than the first threshold thickness is thicker than plain paper and thus is, for example, card stock paper, label paper, stationery, or the like. The preset conveying distance used for the thicker paper is shorter than the conveying distance used when the sheet 41 is the first threshold thickness or less.

The control unit 71 executes control such that the conveying distance used when the thickness of the sheet 41 greater than the first threshold thickness is less than the conveying distance used when the thickness of the sheet 41 is the first threshold thickness or less. With this configuration, when information is acquired (either by user input or sensor detection) indicating that a sheet 41 is thicker than plain paper (first threshold thickness or less) is being used, the control unit 71 can set the conveying distance and the conveying speed for the alignment without using the control table.

In the first embodiment, the control unit 71 acquires the information indicating the thickness of the sheet 41 in accordance with an instruction input through the control panel.

In the second embodiment, the control unit 71 acquires the information regarding the thickness of the sheet 41 based on the sheet thickness detection result from the thickness detection sensor 67.

The preset conveying distance and the preset conveying speed may be a conveying distance and a conveying speed that are set in advance as a factory setting as in the related art or may be a conveying distance and a conveying speed that are preset by the user during device setup or the like.

In each of the example embodiments, the alignment of a sheet 41 that has been fed from the sheet accommodation unit 40 has been described. In manner similar to the example embodiments, alignment for sheets supplied via an auto document feeder (ADF) for scanning or the like, the sheet alignment method and configurations described above may be adopted.

In some examples, only one or the other of the conveying distance and the conveying speed to be used during the alignment process may be set based on the measured transit time and/or sheet thickness (type). For example, the set conveying speed may be substantially constant while the conveying distance is varied according to differences in measured transit times.

Some functions of the image forming apparatus 1 or image forming apparatus 1a may be implemented by a computer. In this case, a program for realizing such functions can recorded in a non-transitory computer-readable recording medium. Such a computer (or a processor therein) may be considered to be a specialized, non-generic apparatus when configured by such program to perform the described functions of the example embodiments or the like.

The definition of "computer system" described herein includes an operating system and additional hardware such as a peripheral device. In addition, the definition of "non-transitory computer-readable recording medium" includes a portable medium and a storage device. The portable medium is, for example, a flexible disk, a magneto-optic disk, a ROM, or a CD-ROM. In addition, the storage device can be a hard disk built into a computer system. Furthermore, the "non-transitory computer-readable recording medium" may be accessible across a network, for example, a network-attached storage device, a file server, a cloud-based storage system.

In addition, a program may realize some part of the above-described functions. In addition, the program may realize some of the above-described functions in combination with programs or software that is recorded in advance in a computer system.

While certain embodiments have been described these embodiments have been presented by way of example only, and are not intended to limit the scope of the present disclosure. Indeed, the novel embodiments described herein may be embodied in a variety of other forms; furthermore various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:
    a conveying roller configured to convey sheets of different types along a conveyance path;
    a first sensor configured to detect a sheet being conveyed along the conveyance path at a first position;
    a second sensor configured to detect the sheet being conveyed along the conveyance path at a second position that is at a first distance downstream of the first position along the conveyance path;
    a registration roller pair that is downstream of the second sensor along the conveyance path; and
    a control unit configured to:
        calculate a transit time for the sheet along the conveyance path between the first position and the second position according to detection results from the first and second sensors,
        set a conveying distance for the sheet after the second position to be used for aligning the sheet against the registration roller pair based on the calculated transit time of the sheet, and
        pause conveyance of the sheet after a leading edge of the sheet passes the second position but before the leading edge of the sheet reaches the registration roller pair, then convey the sheet by the set conveying distance after the pause.

2. The image forming apparatus according to claim 1, wherein the control unit sets the conveying distance based additionally on an indication of a sheet type of the sheet input by a user.

3. The image forming apparatus according to claim 2, wherein the control unit is further configured to set a conveying speed to be used for conveying the sheet by the set conveying distance after the pause for aligning the sheet based on the indication of the sheet type.

4. The image forming apparatus according to claim 2, wherein the control unit selects the conveying distance to be set by reference to a control table storing conveying distances in association with combinations of sheet type and transit time.

5. The image forming apparatus according to claim 1, wherein the control unit selects the conveying distance to be set by reference to a control table storing conveying distances in association with transit times.

6. The image forming apparatus according to claim 1, further comprising:
    a control panel configured to receive user inputs indicating a sheet type to be conveyed, wherein
    the control unit is further configured to receive a user input indicating a sheet type of the sheet being conveyed along the conveyance path, and
    the control unit sets the conveying distance based additionally on the user input indicating the sheet type the sheet being conveyed along the conveyance path.

7. The image forming apparatus according to claim 6, wherein the control unit is further configured to set a conveying speed to be used for conveying the sheet by the set conveying distance after the pause for aligning the sheet based on the sheet type indicated by the user input.

8. The image forming apparatus according to claim 6, wherein the control unit selects the conveying distance to be set by reference to a control table storing conveying distances in association with combinations of sheet type and transit time.

9. The image forming apparatus according to claim 1, further comprising:
    a thickness detection sensor configured to detect a thickness of the sheet being conveyed along the conveyance path, wherein
    the control unit sets the conveying distance based additionally on the detected thickness of the sheet.

10. The image forming apparatus according to claim 9, wherein the control unit is further configured to set a conveying speed to be used for aligning the sheet based on the detected sheet thickness.

11. The imaging forming apparatus according to claim 9, wherein, if the detected thickness of the sheet is greater than a first threshold thickness, the conveying distance is set to a preset conveying distance value.

12. The image forming apparatus according to claim 9, wherein the thickness detection sensor is at position on the conveyance path between the conveying roller and the registration roller pair.

13. The image forming apparatus according to claim 1, wherein at the first and second sensors detect the leading edge of the sheet.

14. The image forming apparatus according to claim 1, further comprising:
    an image forming unit downstream of the registration roller pair along the conveyance path and configured to form an image on the sheet.

15. An image forming apparatus, comprising:
    an image forming unit configured to form an image on sheets of different types;
    a conveying roller configured to convey a sheet along the conveyance path from a sheet accommodation unit towards the image forming unit;
    a first sensor configured to detect the sheet being conveyed along the conveyance path at a first position;
    a second sensor configured to detect the sheet being conveyed along the conveyance path at a second position that is at a first distance downstream of the first position along the conveyance path;
    a registration roller pair that is downstream of the second sensor and upstream of the image forming unit along the conveyance path; and
    a control unit configured to:
        calculate a transit time for the sheet along the conveyance path between the first position and the second position according to detection results from the first and second sensors,
        set a conveying distance and a conveying speed for the sheet after the second position to be used for aligning the sheet against the registration roller pair based on the calculated transit time of the sheet and a thickness of the sheet being conveyed, and pause conveyance of the sheet after a leading edge of the sheet passes the second position but before the leading edge of the sheet reaches the registration roller pair, and then convey the sheet by the set conveying distance at the set conveying speed after the pause.

16. The image forming apparatus according to claim 15, further comprising:

a thickness detection sensor along the conveyance path and configured to detect the thickness of the sheet being conveyed and output the detected thickness to the control unit.

17. The image forming apparatus according to claim 15, wherein the thickness of the sheet is designated by a user input.

18. A sheet conveyance control method for an image forming apparatus, the method comprising:

conveying a sheet along a conveyance path towards a registration roller pair by using a conveyance roller;

detecting the sheet being conveyed along the conveyance path at a first position using a first sensor;

detecting the sheet being conveyed along the conveyance path at a second position that is at a first distance downstream of the first position along the conveyance path using a second sensor;

calculating a transit time for the sheet along the conveyance path between the first position and the second position according to detection results from the first and second sensors;

pausing conveyance of the sheet after detecting of the sheet at the second position but before a leading edge of the sheet reaches the registration roller pair;

setting a conveying distance for the sheet after the second position to be used for aligning the sheet against the registration roller pair based on the calculated transit time of the sheet; and conveying the sheet by the set conveying distance after the pausing.

19. The sheet conveyance control method according to claim 18, wherein the setting of the conveying distance is further based on a thickness of the sheet.

* * * * *